Apr. 3, 1923. 1,450,545
O. E. HANS
APPARATUS FOR SEPARATING LIQUIDS OF DIFFERENT DENSITIES
Filed Apr. 13, 1920
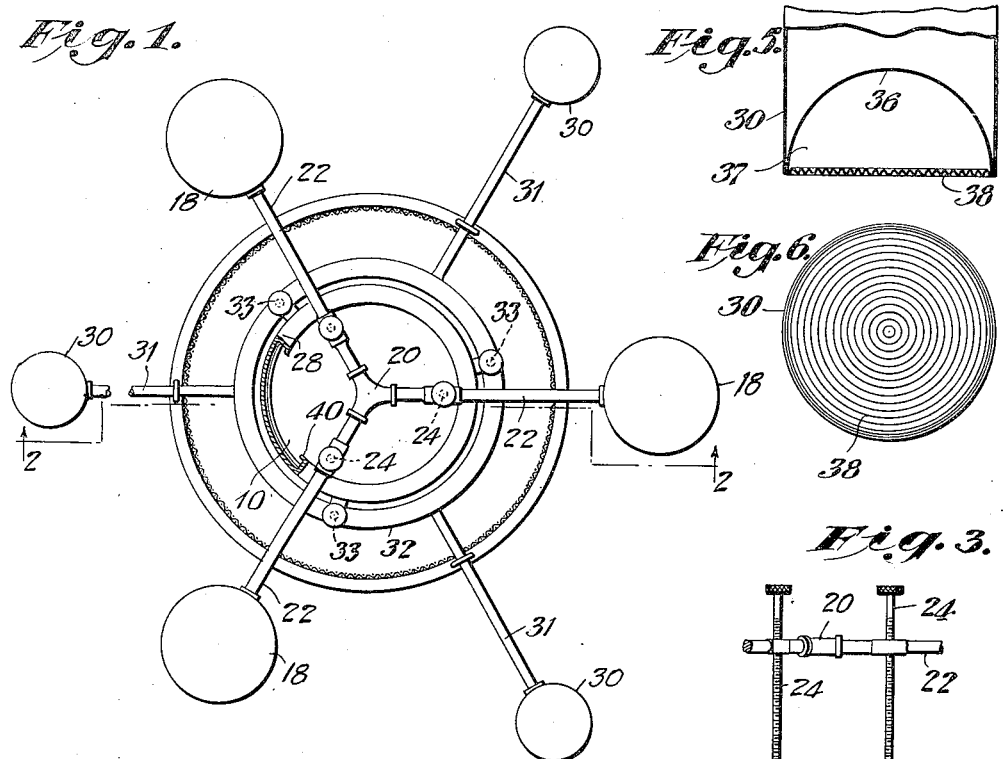
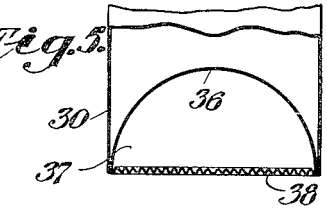
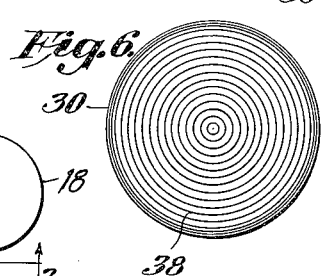
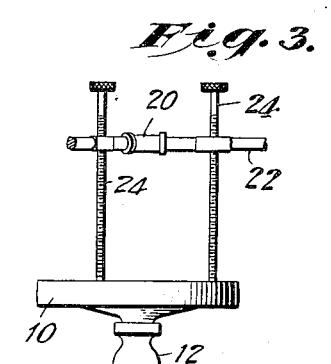
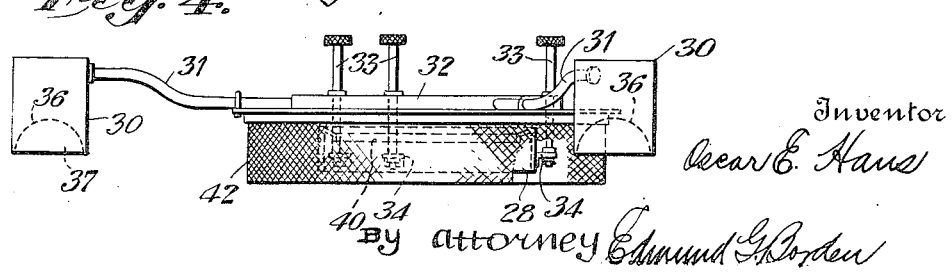
Inventor
Oscar E. Hans
By attorney Edmund G. Borden Patented Apr. 3, 1923.

1,450,545

UNITED STATES PATENT OFFICE.

OSCAR E. HANS, OF BARTLESVILLE, OKLAHOMA.

APPARATUS FOR SEPARATING LIQUIDS OF DIFFERENT DENSITIES.

Application filed April 13, 1920. Serial No. 373,589.

*To all whom it may concern:*

Be it known that I, OSCAR E. HANS, residing at Bartlesville, in the county of Washington, State of Oklahoma, have invented certain new and useful Improvements in Apparatus for Separating Liquids of Different Densities; and I do hereby declare the following to be a full, clear, and exact description of the invention, such as will enable others skilled in the art to which it appertains to make and use the same.

This invention relates to an apparatus for separating liquids of different densities and more particularly to an apparatus for separating a mixture of liquids having a varying density which varies gradually from the density of the lightest liquid in the uppermost level of a body of liquid to the density of the heaviest liquid in the lowermost level of the liquid body, into portions having definite density limits.

Mixtures of liquids of the latter character are found frequently in the production of petroleum oil where the crude oil is mixed with salt solution as it comes from the well. The water produced with the oil under these circumstances does not form a separate, distinct body of liquid, but is disseminated throughout the oil in a large number of fine drops or particles. When a body of mixed oil and water of this character is permitted to stand, the particles of water gradually settle downwardly through the oil, leaving an upper portion of the body of liquid substantially free from water, and an intermediate portion containing increasingly larger quantities of water, finally merging into a lowermost stratum of substantially oil free water. Only that portion of the liquid which consists of pure oil or contains a minimum amount of water can be sold or refined. To separate all of the upper layer of salable oil from the lower portions of oil containing water above the allowable limit is, however, a very difficult operation, because the character of the mixture changes gradually and imperceptibly and it is, therefore, impossible to judge from the appearance of the oil in the separating tank just how much water it contains, the only readily distinguishable physical characteristic being the greater density or gravity of the liquid mixture. The separation of liquid mixtures of this sort, therefore, requires entirely different treatment and apparatus of different capabilities, than in the case of mixtures of liquids which separate into sharply defined strata, since in the latter case the line of separation may be readily determined.

The separation of oil containing a minimum amount of water from mixtures of oil and water is further complicated by the change in density of the mixture with changes in temperature. Thus, at a certain temperature, say 20° C., a mixture containing a limiting amount of water will have a definite density, but at temperature higher or lower than this definite temperature, the mixture will be correspondingly lighter or denser. Since the density or gravity of the mixture varies with slight changes in the proportions of oil and water, the variation in density with small temperature changes interferes with the proper separation of the liquid. If the density of the oil mixture containing the maximum limit of water at a definite temperature be taken as a determining characteristic for the separation of the oil, the separation of the oil at temperatures other than that chosen as the standard will be unsatisfactory. At temperatures above the standard temperature, too much water will be included with the oil, and at temperatures below the standard temperature, salable oil will be rejected.

The primary object of the present invention is, therefore, to provide an apparatus by which a mixture of liquids may be automatically separated into portions of different densities.

Another object of the invention is to provide an apparatus by which oil containing less than a definite quantity of water may be separated from a mixture of oil and water under any temperature conditions.

A further object of the invention is to provide an apparatus for separating a mixture of liquids of different densities into portions with definite limiting proportions of liquid which will be independent of temperature changes in the liquid mixture.

A further object of the invention is to provide an apparatus by means of which a body of liquid of gradually varying density may be separated into different portions having a desired average density.

With these and other objects in view, the invention consists in the apparatus described in the following specification and defined in the claims.

The main features of the invention are shown in the accompanying drawings in which:

Fig. 1 is a plan view of a liquid separator embodying the preferred form of the invention, parts being broken away to more clearly bring out the details of construction;

Fig. 2 is a vertical section of the separating device, taken on line 2—2 of Fig. 1;

Fig. 3 is a detailed elevation of a portion of the collecting element of the separating device;

Fig. 4 is an elevation of the skimming element of the separating device;

Fig. 5 is a sectional view, on an enlarged scale, of a float element forming a part of the separating device; and Fig. 6 is a plan view of the bottom of the float element shown in Fig. 5.

The liquid separator forming the subject matter of the present invention is of the hydrometer type of separators by which liquid is removed from the surface of the body of liquid by means of a skimmer which is automatically controlled by floats acting in accordance with the density of the liquid. With this type of apparatus, it is impossible to make an automatic separation of a liquid of varying density into several bodies of liquid of different average densities by means of a single skimming element, which has a draw-off element attached thereto, on account of the limitations in mechanical construction. This is due to the fact that the apparatus cannot be made sufficiently sensitive to take care of the gradual changes in density. For example, if a skimming device is designed so that it will float immediately below the surface of the liquid to be treated when the draw-off pipe is empty, it will sink to the bottom of the liquid when the draw-off pipe is filled unless the supporting floats are of such a size that they will not respond to slight changes in density. Further, if a float operated skimmer having a draw-off tube attached thereto is adjusted to operate correctly in the upper levels of a body of liquid, it will be necessary to have the buoyant effect of the supporting floats automatically vary in accordance with the variations of the liquid density because the weight of the draw-off tube gradually increases as the liquid being drawn off becomes more dense.

These difficulties have been overcome in the present invention by making the separating device of two float-controlled elements. One of the elements consists of a draw-off tube having its collecting mouth supported by floats of such a type that the collecting mouth will be held a short distance below the surface of a liquid of any density whether or not the draw-off tube is filled with liquid. The other element consists of a skimming element which is supported by floats independently of the collecting tube and arranged to be held in a predetermined position in the liquid so as to draw off a liquid having definite density limits.

When the liquid separating device is placed in the body of liquid to be separated, the lighter liquid flows over the upper edge of the skimming element and enters the inlet mouth of the draw-off tube. The latter may, thereupon, be drawn downwardly to a slight extent but not sufficiently to bring it out of contact with the skimming element. Since the inlet mouth is movable independently of the skimming element, the position of the latter is unaffected by the movement of the inlet mouth and remains slightly below the level of the liquid until it sinks into a stratum of greater density than that desired, at which point the supporting floats raise the upper edge of the skimming element to the level of the liquid and stop the inflow of liquid.

The floats controlling the skimming element are of such construction that their buoyancy increases with an increase of temperature and decreases with a temperature decrease in the same proportion as the density of the oil and water varies with the temperature, so that the skimming element will be lifted to the surface when the limiting proportion of oil and water is reached under any temperature conditions.

Referring to the accompanying drawings, the draw-off tube comprises a shallow collecting cone 10 (Figs. 2 and 3) connected through a ball and socket joint 12 with a flexible outlet pipe 14 leading through the lower part of a settling tank 16. The collecting cone 10 forms an inlet mouth for the draw-off tube and is maintained at a short distance below the level of the liquid in the tank 16 by means of three floats 18 rigidly connected together by means of a central triangular yoke 20 (Fig. 1) and radial arms 22. The collecting cone is adjustably suspended from the arms 22 of the float device by means of screws 24 passing through the arms 22 and rotatably mounted into lugs 26 attached to the upper surface of the collecting cone. The float elements 18 are of such a size and weight that they are not drawn down into the liquid to any great extent by the filling of the tube 14, and they, therefore, maintain the upper edge of the collecting cone within a short distance of the surface of the liquid under all conditions. Floats of this character do not permit slight gradations in density of the liquid to appreciably vary the position of the collecting cone 10 and are therefore unsuitable for effecting an exact separation of liquids at a definite limiting density.

The separation of the liquids is effected by a skimming rim or collar 28 (Figs. 1, 2 and 4) which closely surrounds the outer edge of the collecting cone 10 and is freely movable in a vertical direction with relation to the latter. The collar 28 is supported by means of three floats 30 (Fig. 1) whose buoyancy is such that a small change in the density of the liquid will cause a relatively large displacement of the floats and collar. The floats 30 are rigidly connected by means of arms 31 to a ring 32 which is adjustably connected to the separating collar 28 by means of three screws 33. The screws 33 are threaded through the ring 32 and are rotatably mounted in lugs 34 fastened to the side of the collar 28. By means of this connection, the relative position of the collar 28 and the floats 30 may be so adjusted that the upper edge of the collar will be lifted to the surface of the liquid whenever it reaches a stratum of liquid of any desired density.

Since the collecting cone 10 and the collar 28 are independently connected to separate float elements and are independently movable, the position of the collar is affected only by changes in the density of the body of liquid which the floats 30 displace. The floats 30 and collar 28 may therefore be made of the very lightest construction so as to be extremely sensitive to changes in the density of the displacing liquid, and may move the upper edge of the collar from a position beneath the surface of the liquid to the surface upon a very slight change in the density of the liquid.

To vary the buoyancy of the skimming elements with the temperature changes to correspond with changes in density of a mixture of limiting proportions, the floats 30 are constructed to expand with an increase in temperature and to contract with a decrease in temperature with the same ratio as the mixture of oil and water expands and contracts with temperature changes. For this purpose, the lower portions of the floats 30 are divided by means of hemispherical partitions 36 into expansion chambers 37 and are provided with corrugated bottoms 38. As the temperature of the floats increases, the air confined in the chamber 37 expands and bulges the bottom 38 outwardly and as the temperature falls the air confined in the chamber contracts and draws the bottom inwardly, thereby varying the displacement and accordingly the buoyancy of the floats.

To prevent the passage of liquid between the collecting cone 10 and the skimming collar 28, the space between the outer face of the cone and the inner face of the collar is made very small so that the passage of fluid therebetween is inappreciable. Since the cone 10 may tilt slightly as the position of the apparatus changes, the outer face of the cone is curved so that it may be deflected about its centre without binding against the collar. The tendency of the cone to tilt is also decreased by the ball and socket joint 12 between the cone 10 and tube 14 making the connection between the cone and tube very flexible and rendering the position of the cone independent of the angle between the tube and the cone. To prevent small particles of sand or grit from falling between the cone 10 and the collar 28 and thereby wedging the two together, the upper edge of the collar is bent inwardly to form an overhanging flange 40. Any pieces of grit falling over the collar will thereby be deflected into the inner part of the cone 10 and be removed through the tube 14. The apparatus is kept free from floating particles by means of a surrounding screen 42 rigidly attached to the arms 32 of the skimming or separating element and extending downwardly into the body of liquid.

When the apparatus is placed within a liquid of a density less than that at which the liquids are to be separated, the upper edges of the collar 28 and cone 10 sink below the level of the liquid. The cone 10 and tube 14 are thereupon filled with liquid and are drawn further into the liquid because of the weighting tendency of the liquid in the tube. This sinking movement will, however, not carry the cone down far enough to break its connection with the collar 28 and permit the entrance of liquid between the cone and the collar. Liquid will continue to flow over the collar 28 and into the cone 10 until the apparatus sinks into a stratum of liquid of a density greater than the desired limit, at which point the buoyancy of the floats 30 will raise the upper edge of the separating collar 28 to the level of the liquid and stop the entrance of liquid into the collecting cone 20. The upper edge of the collar serves as a controlling overflow edge for the draw-off element and acts to govern the inflow of fluid to the latter. As the density of the mixture varies with changes in temperature, the buoyancy of the floats 30 varies correspondingly and the separation of the liquids takes place when mixtures of the limiting proportions are reached, regardless of the temperature. The relative positions of the collar 28 and floats 30 may be adjusted by means of the screws 24 to lift the edge of the collar above the surface of the liquid at any desired position of the floats and the limit of separation may thereby be varied.

Having described the invention, what is claimed as new is:

1. An apparatus for separating liquids of different densities, comprising a draw-off tube, means for drawing liquid from the upper portion of a body of liquid into said draw-off tube, and separate means mounted to be maintained adjacent the surface of the body of liquid for preventing an inflow of liquid to said draw-off means when said means reaches a liquid of a definite density.

2. An apparatus for separating liquids of different densities which comprises a collecting and draw-off element held in proximity to the upper surface of the liquid, an overflow edge closely surrounding and vertically movable in respect to said collecting and draw-off element, and floats supporting said edge.

3. An apparatus for separating liquids of gradually varying densities which comprises a draw-off means, means to hold the inlet of the draw-off means adjacent the upper surface of a body of liquid, and means for permitting liquids of less than a definte limiting density to enter said draw-off means and for preventing the passage of liquids of greater density into said draw-off means.

4. An apparatus for separating liquids of different densities which comprises a draw-off tube having an inlet opening, a float device for adjustably supporting said inlet opening in proximity to the upper surface of a body of liquid, a collar surrounding said inlet opening, and float supporting said collar in such a relation as to bring the collar below the surface of said liquid when the floats are in a liquid of less than a limiting density, and raise the upper edge of said collar to the surface of the liquid when the floats reach a liquid of limiting density.

5. An apparatus for separating liquids of different densities which comprises a collecting and draw-off element, held adjacent the upper surface of the liquid, an overflow edge vertically movable in respect to, and controlling the inflow of fluid to, said collecting and draw-off element, and floats supporting said edge independently of said draw-off element.

6. An apparatus for separating liquids of different densities which comprises a flexible draw-off tube, an inlet mouth for said tube, floats arranged to support said mouth adjacent the upper surface of a body of liquid, a collar closely surrounding and independently movable in relation to said mouth and floats supporting said collar.

7. An apparatus for separating liquids of different densities which comprises a flexible draw-off tube, a collecting mouth for said tube, floats arranged to support said mouth in proximity to the upper surface of a body of liquid, a collar closely surrounding and independently movable in relation to said mouth, floats supporting said collar and an adjustable connection between said floats and said collar.

8. An apparatus for separating liquids of different densities which comprises a flexible draw-off tube, a collector, a flexible connection betwen said collector and said draw-off tube, means for supporting said collector adjacent the upper surface of said liquid, a collar closely surrounding said collector, and floats for supporting said collar independently of the position of said collector.

9. An apparatus for separating liquids of different densities which comprises a flexible draw-off tube, a collecting cone having a rounded outer edge, a flexible connection between said cone and said draw-off tube, means for supporting said cone adjacent the upper surface of said liquid, a collar closely surrounding the outer edge of said cone, floats for supporting said collar independently of the position of said cone, and a flange on the upper edge of said collar overhanging the outer edge of said cone.

10. An apparatus for separating liquids of different densities which comprises a flexible draw-off tube, a collecting cone having a rounded outer edge, a ball and socket joint between said cone and draw-off tube, means for supporting said cone adjacent the surface of said liquid, a collar closely surrounding the outer edge of said cone, and floats supporting said collar independently of the position of said cone.

11. An apparatus for separating liquids of different densities comprising a draw-off means for said liquid, means for preventing the inflow of liquid to said draw-off means when said means reaches a liquid of a definite density, and means for varying said density limit with changes in temperature of said liquid.

12. An apparatus for separating liquids of different densities which comprises a collecting and draw-off element, an overflow edge closely surrounding and vertically movable in respect to said collecting and draw-off element, floats supporting said overflow edge and means for varying the buoyancy of said floats with changes in temperature of said liquid.

13. An apparatus for separating liquids of different densities which comprises a draw-off tube having an inlet opening, a float device for adjustably supporting said inlet opening, in proximity to the outer surface of a body of liquid, a collar surrounding said inlet opening, floats supporting said collar in such a relation as to bring the collar below the surface of said liquid when the supporting floats are in a liquid of less than a limiting density, and to raise the upper edge of said collar to the surface of said liquid when the floats reach a liquid of greater than said limiting density, a flexible bottom for said floats and a partition in said floats forming an enclosed chamber with said flexible bottoms.

14. An apparatus for separating liquids of different densities which comprises a collecting and draw-off element, an overflow edge vertically movable in respect to and controlling the inflow of fluid to said draw-off and collecting element, floats supporting said edge independent of said draw-off element, and means for varying the buoyancy of said floats to correspond with changes in temperatures of said liquid.

15. An apparatus for separating liquids of different densities which comprises a collecting and draw-off element, an overflow edge, vertically movable in respect to and controlling the inflow of fluid to said collecting and draw-off element, floats supporting said edge independently of said draw-off element, and expansible chambers in said floats arranged to expand and contract as the temperature of said liquid rises and falls.

16. An apparatus for separating liquids of different densities, comprising a draw-off means for said liquid, means for preventing the inflow of liquid to said draw-off means when said means reaches a liquid of a definite density, floats controlling said latter means, and an expansible chamber in said floats arranged to vary the displacement of said floats.

In testimony whereof I affix my signature.

OSCAR E. HANS.